United States Patent
Lu et al.

(10) Patent No.: US 11,281,383 B2
(45) Date of Patent: Mar. 22, 2022

(54) SIDE-CHANNEL ATTACK RESISTANT FUSE PROGRAMMING

(71) Applicant: Intel Corporation, Santa Clara, CA (US)

(72) Inventors: Ting Lu, Austin, TX (US); Sean R. Atsatt, Santa Cruz, CA (US); Andrew Martyn Draper, Chesham (GB); Eric Michael Innis, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 847 days.

(21) Appl. No.: 15/940,799

(22) Filed: Mar. 29, 2018

(65) Prior Publication Data
US 2019/0042118 A1    Feb. 7, 2019

(51) Int. Cl.
| | |
|---|---|
| *G06F 12/00* | (2006.01) |
| *G06F 13/00* | (2006.01) |
| *G06F 13/28* | (2006.01) |
| *G06F 3/06* | (2006.01) |
| *G06F 21/79* | (2013.01) |
| *G06F 12/16* | (2006.01) |
| *G11C 17/18* | (2006.01) |
| *G06F 21/60* | (2013.01) |
| *G06F 21/76* | (2013.01) |
| *G06F 21/85* | (2013.01) |
| *G06F 21/75* | (2013.01) |

(52) U.S. Cl.
CPC .......... *G06F 3/0623* (2013.01); *G06F 3/0629* (2013.01); *G06F 3/0659* (2013.01); *G06F 3/0673* (2013.01); *G06F 3/0679* (2013.01); *G06F 12/16* (2013.01); *G06F 21/604* (2013.01); *G06F 21/75* (2013.01); *G06F 21/76* (2013.01); *G06F 21/79* (2013.01); *G06F 21/85* (2013.01); *G11C 17/18* (2013.01); *G06F 2212/1052* (2013.01)

(58) Field of Classification Search
CPC ...... G06F 3/0622; G06F 3/0629; G06F 21/71; G06F 21/78
USPC ....................................................... 711/163
See application file for complete search history.

(56) References Cited

U.S. PATENT DOCUMENTS

| | | | |
|---|---|---|---|
| 2004/0124458 A1 | 7/2004 | Kothandaraman | |
| 2007/0121411 A1* | 5/2007 | Riley | G11C 17/18 365/225.7 |
| 2007/0297606 A1* | 12/2007 | Tkacik | G06F 21/6218 380/239 |

(Continued)

*Primary Examiner* — Edward J Dudek, Jr.
*Assistant Examiner* — Sidney Li
(74) *Attorney, Agent, or Firm* — Fletcher Yoder, P.C.

(57) ABSTRACT

The disclosed systems and methods may secure the fuse programming process in programmable devices to reduce or eliminate malicious discovery of data (e.g., the encryption key, the configuration bitstream) stored in nonvolatile memory via side-channel attacks. A processor may generate a randomized fuse list and the fuses may be blown in the randomized order. Additionally or alternatively, the processor may randomize the wait time between programming of each fuse. Further, the processor may generate a simplified fuse list including only fuses to be blown. The disclosed security systems and methods may be used individually or in combination to prevent determination of sensitive data, such as the encryption key, by monitoring, for example, power consumption in side-channel attacks.

20 Claims, 7 Drawing Sheets

(56) References Cited

U.S. PATENT DOCUMENTS

2014/0253221 A1\* 9/2014 Sandri ................... G06F 21/79
  327/525
2016/0092674 A1\* 3/2016 Hughes .................. G06F 21/53
  726/22

\* cited by examiner

SIDE-CHANNEL ATTACK RESISTANT FUSE PROGRAMMING

BACKGROUND

The present disclosure relates generally to integrated circuits, such as field-programmable gate arrays (FPGAs). More particularly, the present disclosure relates to securing data programmed into nonvolatile memory during configuration of an integrated circuit (e.g., an FPGA).

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Modern electronics such as computers, portable devices, network routers, data centers, Internet-connected appliances, and more, tend to include at least one integrated circuit device. Integrated circuit devices take a variety of forms, including processors, memory devices, and programmable devices, to name only a few examples. Field-programmable gate arrays (FPGAs) are one type of programmable device utilizing integrated circuits. Programmable devices may include programmable logic that may be programmed (e.g., configured) after manufacturing to provide a wide variety of functionality.

Configuration and reconfiguration of the programmable logic may be performed by loading and reloading a description of a desired configuration circuit design (e.g., a configuration bitstream) into memory of a programmable device. Given the importance of the configuration bitstream, programmable devices may secure the configuration bitstream data. For example, a volatile memory-based (e.g., random access memory (RAM)) programmable device may decrypt an encrypted configuration bitstream using an encryption key stored in an internal nonvolatile memory.

However, in some circumstances, securing the configuration bitstream may be susceptible to side-channel attacks that may identify configuration bitstream data values and thereby the circuit design. For example, monitoring power consumed by a programmable device while programming data into nonvolatile memory may reveal the encryption key and indirectly, the configuration bitstream itself. In some instances, a programmable device may be configured in a secure environment with trusted personnel to reduce risk of a side-channel attack. However, securing such a programming environment may be expensive and may reduce flexibility for in-field configuration.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
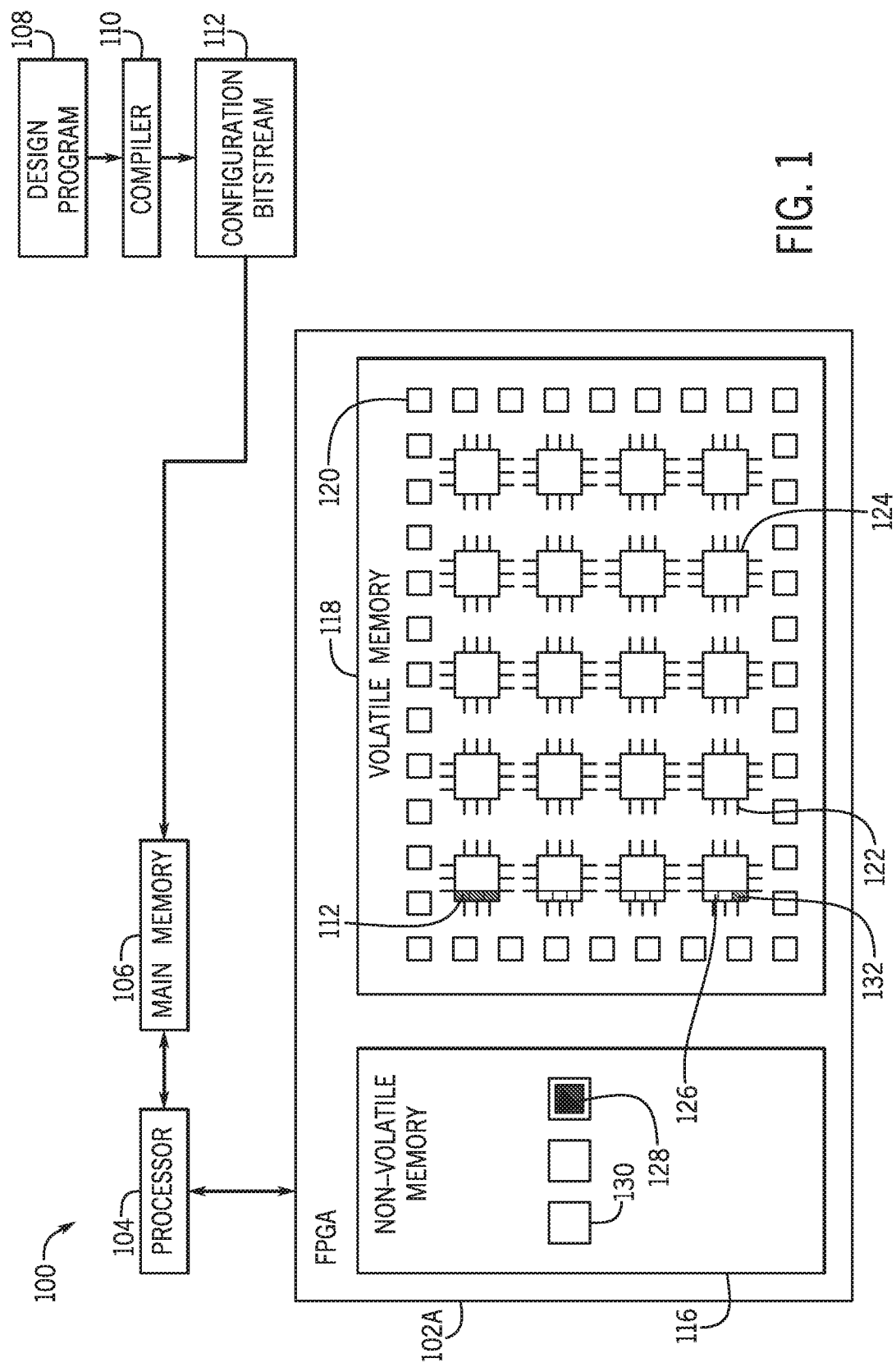
FIG. 1 is a schematic diagram of a programmable system-on-chip (PSoC) including a field-programmable gate array (FPGA) having nonvolatile memory for storing data, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Generally, programmable devices (e.g., FPGAs) may be programmed (e.g., configured) and reprogrammed to realize a circuit design, for example, via a configuration bitstream describing the circuit design. The configurable nature of the programmable devices makes the devices useful for post-manufacturing (e.g., in-field) configuration applications. As the value of the applications run on and data stored in programmable devices increases, so does the desire for securing data (e.g., the configuration bitstream) held in memory of a programmable device, particularly when in-field configuration is performed by third party vendors.

In some instances, security methods used to protect the configuration bitstream are susceptible to side-channel attacks (e.g., simple power analysis (SPA) and differential power analysis (DPA)), which monitor the physical operation (e.g., power consumption) of a programmable device to determine the programmed values. Thus, the security of the configuration bitstream may be compromised despite using configuration bitstream security methods. For example, standard security configuration procedures for many FPGAs, such as those manufactured by Intel® Corporation, may include programming secure data (e.g., an encryption key) into nonvolatile memory of the programmable device that may decrypt data (e.g., the configuration bitstream) stored in volatile and/or nonvolatile memory. Large surges of current may be used to program the secure data, resulting in spikes in power consumption corresponding to programming low values of the secure data. A large surge of current may be an amount of current used in a time period that is greater than that used during normal operation of the programmable device. It should be appreciated that future references to the secure data includes any information stored within fuses (e.g., the configuration bitstream, the encryption key, signing keys).

A fuse may be a solid-state device that may store programming values using a large surge of current. Fuses may include antifuses, which are solid-state devices that may also use large amounts of current to store data values, but have operational characteristics opposite to that of fuses. For example, a large current surge in a fuse may program a low (i.e., a bit value of zero) while a large current surge in an antifuse may program a high (i.e., a bit value of one). Fuses and antifuses may be implemented in any suitable storage medium that results in a spike of current when programming a data value, which may include memory cells in a non-volatile memory or in volatile memory. It should be understood that further references to "fuse" in the application may apply to any suitable memory medium that uses a spike in current to program values in the memory medium, including, but not limited to, antifuses.

In some instances, a secure configuration environment may be used to prevent discovery of the configuration bitstream via side-channel attacks. However, securing such a programming environment may present varying tradeoffs. For example, maintaining secure programming locations and trusted personnel may be expensive. Further, configuring the programmable device in a secure location may be expensive and may reduce the flexibility for in-field configuration of the programmable device. Thus, improved systems and methods for securing the data programmed into nonvolatile memory may be desired.

Accordingly, the present disclosure provides systems and methods for securing data (e.g., the encryption key) programmed into fuses during configuration by securing the programming process, for example, to prevent unauthorized access of the configuration bitstream via SPA and/or DPA side-channel attacks. In an embodiment, data programmed into fuses may be secured by shuffling the order in which the fuses are programmed. In some embodiments, a variable wait time between programming each cell fuse may increase uncertainty of the fuses's programmed value as determined via SPA and/or DPA side-channel attacks. For example, the time elapsed between programming a first fuse and a second fuse may be substantially different than the time elapsed between programming the second fuse and a third fuse. In alternative or additional embodiments, not programming fuses that already store the programming values may allow for a constant stream of high magnitude current during programming, resulting in a reduction or elimination of the ability to detect variations in power consumed by the programmable device. For example, a fuse that is to be programmed as a high (i.e., a bit value of one) may not need high magnitude current to program the value and thus may be eliminated from the fuse programming list. These techniques may be used, for example, in different regions of nonvolatile memory or in combination in one or more regions of nonvolatile memory. As such, securing the data programmed in the fuses using the presently disclosed techniques may reduce or eliminate reliance on secure configuration environments, thereby reducing cost and improving in-field configuration flexibility.

With the foregoing in mind, FIG. 1 is a schematic diagram of a programmable system-on-chip (PSoC) 100 having a field-programmable device capable of fuse programming and reconfiguration, in accordance with an embodiment of the present disclosure. For the purposes of this example, the programmable device is shown as a field-programmable gate array (FPGA) 102A, although it should be understood that the programmable device may be any type of programmable logic device (e.g., an application-specific integrated circuit, an application-specific standard product, or the like). It should also be appreciated that while the FPGA 102A of FIG. 1 includes nonvolatile memory for storing the secure data and volatile memory for storing the configuration bitstream, an FPGA of another embodiment may include only nonvolatile memory for storing the secure data (e.g., the encryption key and/or the configuration bitstream). In addition, the PSoC 100 may include a processor 104 that interacts with the FPGA 102A. It should be appreciated that instead of a hard processor 104 external to the FPGA 102A, the processor 104 may be implemented as a soft processor within the FPGA 102A itself.

The processor 104 may include a hardware processor that functions as a central processing unit (CPU) and executes system software and user application software. The processor 104 may include multiple microprocessors and/or one or more other integrated circuits (e.g., application-specific integrated circuits, FPGAs, reduced instruction set processors, and the like). Further, the processor 104 may interact with main memory 106 that may include a tangible, non-transitory, machine-readable-medium, such as volatile memory (e.g., random access memory (RAM)) and/or nonvolatile memory (e.g., read-only memory (ROM)), flash memory, or any suitable optical, magnetic, or solid-state storage medium, or any combination thereof.

The main memory 106 may store machine-readable and/or processor executable instructions (e.g., firmware or software), such as control software, configuration bitstream, look up tables (LUTs), etc. In some embodiments, the main memory 106 may store configuration software, instructions to determine one or more security measures to be performed during programming of nonvolatile memory (e.g., fuse programming), instructions on performing the security measures, and the like. The processor 104 may facilitate interaction of software applications with hardware components of the FPGA 102A, programming of nonvolatile memory data, loading of the configuration bitstream onto the FPGA 102A, and the like.

A designer may develop a circuit design to be implemented onto the FPGA 102A using a design program 108, such as a version of Quartus by Intel® Corporation. The design program 108 may then be converted into a low-level circuit design program (e.g., configuration bitstream 112) by the compiler 110. That is, the compiler 110 may provide machine-readable configuration instructions in the form of the configuration bitstream 112 representative of the circuit design to the FPGA 102A. In some embodiments, configuration bitstream 112 may be stored in an external memory device, such as the main memory 106, prior to configuration. The configuration bitstream 112 may be loaded directly into the FPGA 102A via the processor 104 or may be sent over a network (e.g., the Internet) for loading into the FPGA 102A.

As illustrated, an FPGA 102A may have input/output logic blocks 120 at the periphery for driving signals from the FPGA 102A and for receiving signals from other devices. Interconnection resources 122, such as global and local vertical and horizontal conductive lines and buses, may be used to route signals on the FPGA 102A. For example, signals received from the input/output logic blocks 120 may be transferred to and from configurable logic blocks (CLBs) 124. Additionally, signals may be transmitted and received between CLBs 124. Interconnection resources 122 may include fixed interconnects (conductive lines) and programmable interconnects (e.g., programmable connections between respective fixed interconnects). It should be appreciated that a fewer or greater number of input/output logic blocks 120, interconnection resources 122, and CLBs 124 may exist than that depicted in FIG. 1.

Configurable logic blocks (CLBs) 124 may be organized using any suitable architecture. As an example, the logic of FPGA 102A (e.g., CLBs 124) may be organized in a series of rows and columns of larger programmable logic regions, each of which may include multiple smaller logic regions. The CLBs 124 may be interconnected by the interconnection resources 122, such as associated vertical and horizontal conductors. For example, the interconnection resources 122 may include global conductive lines that span substantially all of the FPGA 102A, fractional lines such as half-lines or quarter lines that span part of the FPGA 102A, staggered lines of a particular length (e.g., sufficient to interconnect several logic areas), smaller local lines, or any other suitable interconnection resource arrangement. Further, in some embodiments, the CLBs 124 may be arranged in more levels or layers in which multiple large regions are interconnected to form still larger portions of logic. Other device arrangements are also contemplated that may use logic arranged in a manner other than rows and columns.

The configurable logic blocks (CLBs) 124 may include combinational and sequential logic circuitry, such as look-up tables (LUTs), registers, flip-flops, and multiplexers, which may allow a designer to implement a variety of logical functionality. The CLBs 124 also may include memory cells 126 in the volatile memory 118 that store the configuration bitstream 112 during programming. It should be appreciated that the configuration bitstream 112 may also be stored memory external to the CLBs 124 but internal to the FPGA 102A. The configuration bitstream 112 may be loaded into the memory cells 126 using input/output pins and/or input/output logic blocks 120. As shown in FIG. 1, the memory cells 126 may include random access memory (RAM) cells that store the configuration bitstream 112. It should be understood that any suitable number of memory cells 126 may be included in the volatile memory 118. Moreover, use of the memory cells 126 based on RAM technology described herein is intended to be only one example as memory cells 126 may also be implemented via fuses and antifuses. Because the RAM cells 126 are loaded with the configuration bitstream 112 during programming, they are sometimes referred to as configuration RAM cells (CRAM).

In some embodiments, the memory cells 126 may each provide a corresponding static control output signal that controls the state (e.g., programmable fabric) of an associated logic component in the CLBs 124. For instance, the output signals may be applied to the gates of metal-oxide-semiconductor (MOS) transistors within the CLBs 124.

By way of example, some FPGAs 102A may be programmed by configuring the CLBs 124 using mask programming arrangements, which may be performed during semiconductor manufacturing. Other FPGAs 102A may be configured after semiconductor fabrication operations have been completed (e.g., via in-field configuration), such as by using electrical programming or laser programming to program the CLBs 124.

In any case, to secure the configuration bitstream 112 from malicious interception while being transmitted to the FPGA 102A, the configuration bitstream 112 may by encrypted prior to being stored in the external memory device (e.g., main memory 106), loaded onto the FPGA 102A, or sent over the network. For example, the configuration bitstream 112 may be encrypted using an Advanced Encryption Standard (AES) algorithm (e.g., via a standalone software encryption tool, such as a version of Qcrypt Tool by Intel® Corporation). Further, the secure data (e.g., the encryption key) 128 that deciphers the configuration bitstream 112 into usable data may be generated at this time. The FPGA 102A may decrypt the configuration bitstream 112, for example, by storing and using the secure data 128.

The secure data 128 may be either a nonvolatile key or volatile key and may be securely stored within the memory of the programmable device. For example, a nonvolatile version of the secure data 128 may be stored in, for example, fuses 130 of the FPGA's nonvolatile memory 116. Further, a volatile key 132 may additionally or alternatively be securely stored in, for example, battery-backed random access memory (RAM) (e.g., 126). A dedicated AES decryptor block (not shown) located within the FPGA 102A may use the secure data (e.g., the encryption key) 128 to decrypt the encrypted configuration bitstream 112 prior to the configuring of the FPGA 102A.

The encrypted configuration bitstream 112 may be decrypted by a decryptor block on the FPGA 102A using the secure data (e.g., the encryption key) 128 stored in the fuses 130. The now decrypted configuration bitstream 112 may be loaded onto the FPGA 102A by storing the bits into the configuration RAM cells (CRAM) 126. Generally, after a set amount of time, programmable logic in the CLBs 124 may change states in response to the respective inputs obtained from the configuration bitstream 112. The FPGA 102A may then be configured according to the circuit design described by the configuration bitstream 112.

Figure 2:
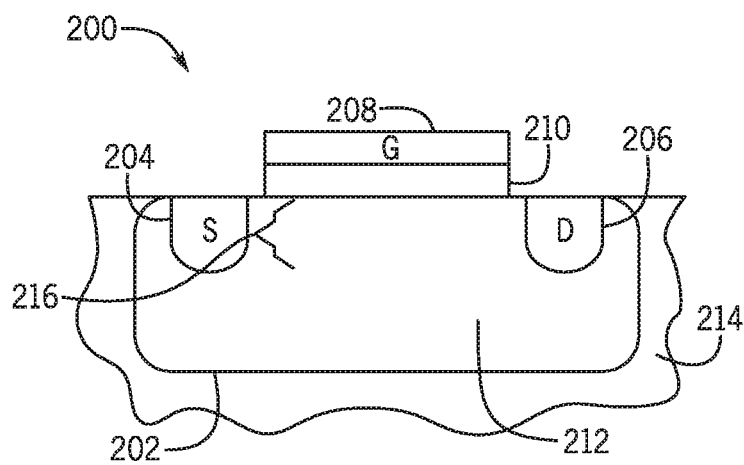
FIG. 2 is a cross-sectional view of a programmable fuse including a transistor, in accordance with an embodiment of the present disclosure.

Programming the secure data (e.g., the encryption key) 128 may commonly be performed in fuse-based nonvolatile memory for Intel® Corporation FPGAs since such data may be maintained even when power to the FPGA 102A is disconnected. FIG. 2 is a cross-sectional view of a programmable fuse 200 comprising a transistor 202, in accordance with an embodiment of the present disclosure. The fuse 200 may be used as a cell in the nonvolatile memory 116 since the fuses 200 are one-time programmable. In particular, the fuse 130 of FIG. 1 may include the structure of the fuse 200 of FIG. 2. The transistor 202 may be a piezoelectronic transistor (PET), or any other transistor capable of growing a permanent conducting or resisting channel that joins two contacts (e.g., source and drain). Additionally, a zener diode, amorphous silicon, dielectrics, and polysilicon among others, may be used in place of the transistor 202 to provide fuse behavior. The transistor 202 may include a source (S) 204, drain (D) 206, and a gate (G) 208. Gate 208 material may be a layer of polysilicon, metal, or any other material that is a good conductor. The source 204 and drain 206 may be semiconductor material, for example crystalline silicon, heavily doped using ion implantation or diffusion techniques. A dielectric 210 of silicon dioxide or another insulating material (e.g., high-κ diaelectric material) may be placed as a barrier between the gate 208 and the well region (e.g., substrate) 212 to reduce leakage current. The well region 212 may be doped semiconductor material, for example doped silicon, in larger workpiece 214 and may contain a conductive layer 216 through which a channel connecting the source 204 and the drain 206 may be formed. It should be appreciated that additional layers of doped and/or insulating material may be present in the well region 212 depending on the electrical fuse technology used.

Figure 3:
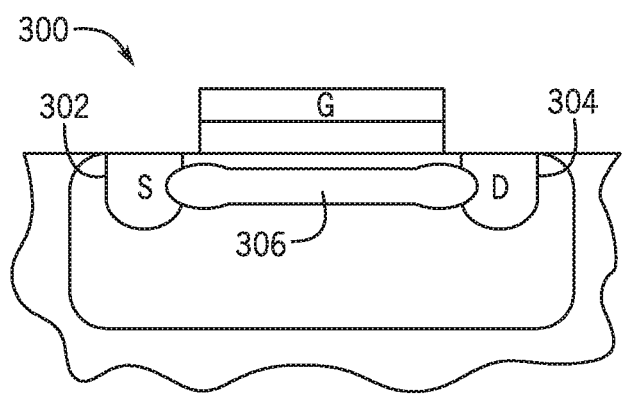
FIG. 3 is a cross-sectional view of a programmable fuse after it has been programmed, in accordance with an embodiment of the present disclosure.

Turning now to FIG. 3, a cross-sectional view of an already programmed fuse 300 is shown, in accordance with an embodiment of the present disclosure. In particular, programming a fuse 300 generally requires a large input of electrical energy to interrupt the material continuity of the electrical fuse technology used. For example, programming may be done by passing a large surge of current through the conductive layer 216 of the fuse 300 to cause electromigration, thermal rupture, and an increase in the resistance. The source 302 may receive the input of electrical energy, for example, the high current, which may result in electromigration and thermal rupture of the conductive layer 216 as the current flows to the drain 304. A permanent high resistance path 306 (that may prevent current flow in the future) may form in the conductive layer 216 as a result. The fuse 300 may now be considered programmed (e.g., blown) and may permanently store a zero. For antifuse technology, a high input of electrical energy may diffuse dopants into the well region 212 and may result in the formation of a conductive region that shorts the source terminal 302 to the drain terminal 304. Because high electrical energy input may be used to disrupt the conductive layer 216, power consumed by the FPGA 102A during the programming of the fuse 300 may be monitored by an interested party to determine the programmed data.

Figure 4:
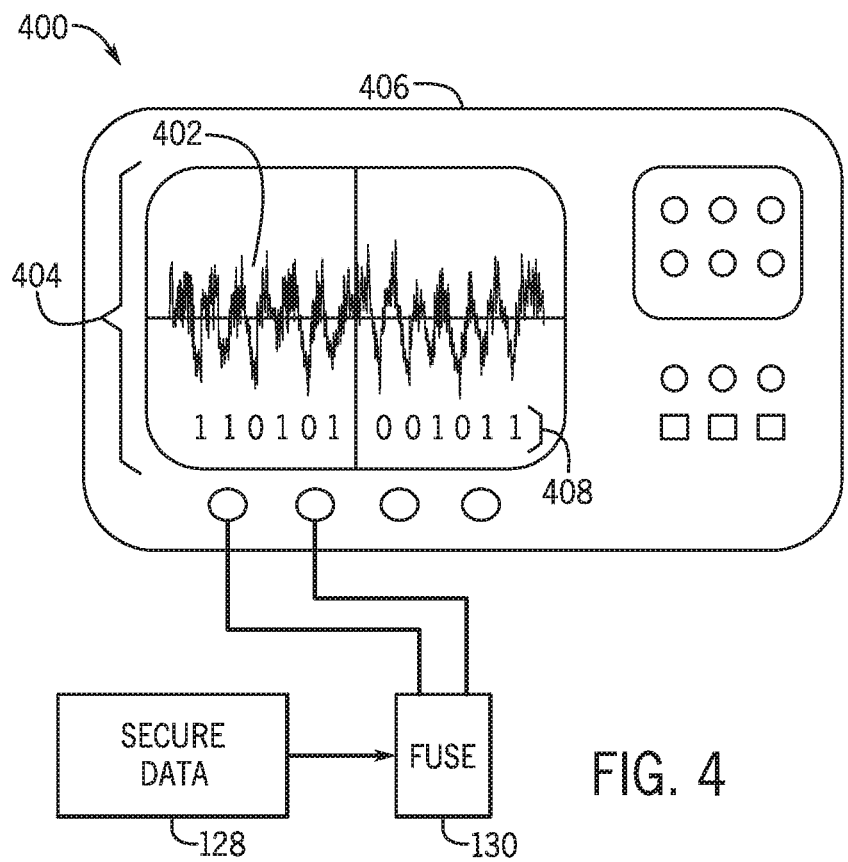
FIG. 4 is a schematic diagram of a side-channel attack occurring during fuse programming of the FPGA of FIG. 1, in accordance with an embodiment of the present disclosure.

With this in mind, FIG. 4 is a schematic diagram of a side-channel attack 400 during the fuse programming of the FPGA 102A, in accordance with an embodiment of the present disclosure. The secure data 128 is received by the FPGA 102A and programmed sequentially into the fuses 130 of the FPGA 102A. As the fuse 130 is programmed, a large spike in power consumption 402 may occur due to the large surge of current required to program (e.g., blow) the fuse 130. The power consumption 402 may be used by the side-channel attack 400 to gain information about the secure data 128 being programmed. In particular, the side-channel attack 400 may decipher at least a portion of the secure data 128 based on power analysis of the fuse programming process. While the present disclosure discusses the side-channel attack 400 attempting to determine the secure data 128 programmed into the fuses 130, it should be understood that the present disclosure applies to any suitable data stored in the fuses 130, or any storage medium that uses a large spike in power consumption to program. Simple power analysis (SPA) and differential power analysis (DPA) are common forms of these attacks on programmable devices, such as the FPGA 102A.

Simple power analysis (SPA) attacks involve the visual interpretation of a power consumption signal 404 of an electronic device since the power consumed by an electronic device varies depending on the operation performed. In particular, current may be examined and traced during programming of fuses 130. As illustrated in FIG. 4, a SPA attack may be executed by electrically connecting the FPGA 102A to an oscilloscope 406 during fuse programming. The oscilloscope 406 may be used to filter noise and/or amplify the power consumption signal 404. As each fuse 130 is programmed to store the secure data 128, variations in the power consumption signal 404 may be readily seen on the oscilloscope 406. Based on the variations, the value 408 of the secure data 128 may be determined. The value 408 may then be used to subsequently decrypt the configuration bitstream 112, for example, as it is sent to the FPGA 102A.

Differential power analysis (DPA) attacks are a more sophisticated form of power analysis that utilize statistical analysis to determine the value of the secure data 128. DPA may be used on complex systems that perform several operations in parallel, such as those using the FPGA 102A, as such parallel operations may generate large amounts of electrical noise. Generally, power consumption during normal non-cryptographic operations is analyzed followed by further analysis during cryptographic operations (e.g., encryption and decryption operations). A statistical model is generated for each analysis to remove electrical noise and the value of the secure data 128 may then be determined.

Figure 5:
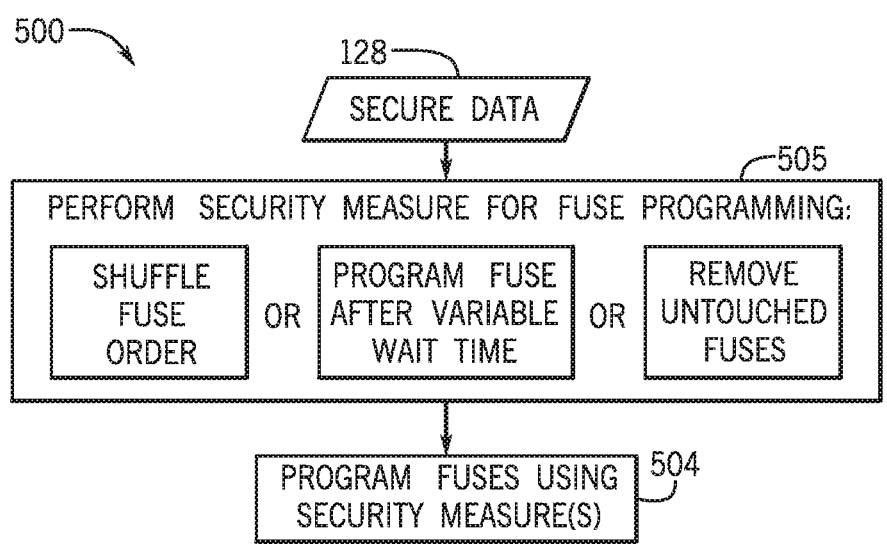
FIG. 5 is a flow diagram of a process used by the FPGA of FIG. 1 to secure data programmed into nonvolatile memory during fuse programming, in accordance with an embodiment of the present disclosure.

The ability to discover the secure data 128 through the simple power analysis (SPA) and differential power analysis (DPA) attacks 400 during fuse programming may be reduced or eliminated by securing the fuse programming process. To this effect, FIG. 5 is a flow diagram of a process 500 that may be used by the FPGA 102A to secure the secure data 128 during the fuse programming, in accordance with an embodiment of the present disclosure. The process 500 may be performed by any suitable device or combination of devices that may receive the secure data 128, perform security measures for fuse programming, and program the fuses 130 using the security measures. While the process 500 is described in a specific sequence, it should be understood that the present disclosure contemplates that the described process may be performed in different sequences than the sequence illustrated, and certain portions of the process may be skipped or not performed altogether. In some embodiments, at least some portions of the process 500 may be implemented by a processor 104. In alternative or additional embodiments, at least some portions of the process 500 may be implemented by any other suitable components or control logic, such as a compiler 110, a processor internal to the programmable device, and the like.

Prior to fuse programming, the processor 104 may perform one or more security measures on the secure data 128 based on the data and other operational constraints (e.g., manipulating fuse programming time, manipulating a number of fuses to be blown) (process block 505). The single security measure, which may shuffle fuse order, program a fuse 130 after a variable wait time, or remove untouched fuses, may be performed on the entirety of the secure data 128. Each of these security measures is discussed in detail below. Further, a single or combination of the security measures may be performed on sections (e.g., 8 bit regions, 256 bit regions, etc.) of the secure data 128 independent of other sections. Additionally, a combination of the security measures may be performed over the entirety of the secure data 128.

After the appropriate security measure(s) have been performed on the secure data 128, the processor 104 may program the fuses 130 based on the performed security measure(s) (process block 504). In some embodiments, instructions for implementing the security measure(s) may be stored in main memory 106 and transmitted to the processor 104 during the fuse programming process. The processor 104 may use the instructions to control the fuse programming process in the FPGA 102A. In this manner, the FPGA 102A may perform the process 500 to secure the data (e.g., the encryption key) 128 programmed into the fuses 130.

Figure 6:
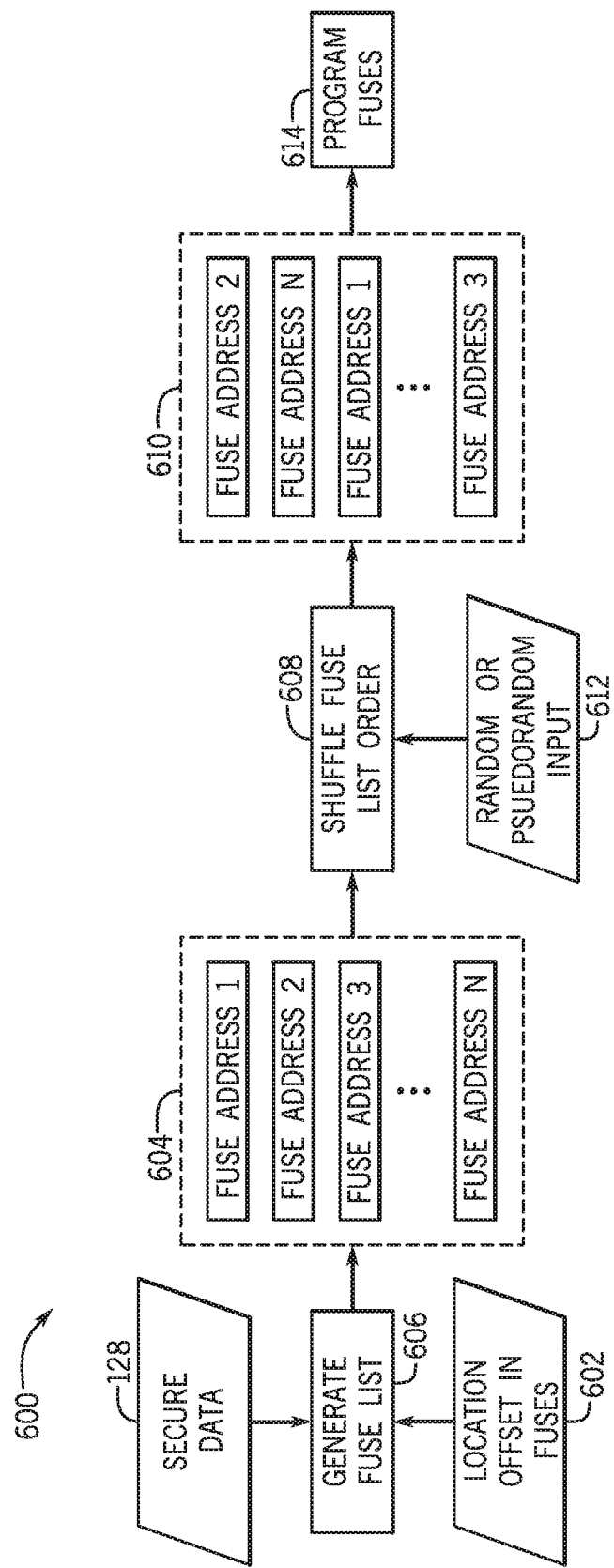
FIG. 6 is a flow diagram of a method used to shuffle fuse programming order in the process of FIG. 5 to prevent side-channel attacks, in accordance with an embodiment of the present disclosure.

With this in mind, FIG. 6 illustrates a security method 600 that may be used to shuffle fuse programming order in the process 500 of FIG. 5 to prevent side-channel attacks 400, in accordance with an embodiment. The method 600 may be performed by any suitable device or combination of devices that may receive the secure data 128, perform the security method 600 for fuse programming, and program the fuses 130 using the security method 600. While the method 600 is described in a specific sequence, it should be understood that the present disclosure contemplates that the described method may be performed in different sequences than the sequence illustrated, and certain portions of the method may be skipped or not performed altogether. In some embodiments, at least some portions of the method 600 may be implemented by a processor 104. In alternative or additional embodiments, at least some portions of the method 600 may be implemented by any other suitable components or control logic, such as a compiler 110, a processor internal to the programmable device, and the like.

The processor 104 may receive the secure data 128 and a fuse location 602 of where the secure data 128 is to be programmed. The processor 104 may generate a fuse list 604 that includes the fuses 130 to be programmed with the secure data 128 and the respective memory addresses of each fuse 130 (process block 606). The processor 104 may generate the fuse list 604 based on the length of the secure data 128 and the fuse location 602 where the secure data 128 is to be programmed. For example, if the fuses 130 in the FPGA 102A have not been programmed, the fuse list 604 may include all the fuses 130 and the respective addresses. In some cases, at least some fuses 130 may already be programmed. As such, the fuse list 604 may not include the fuses 130 that already have been programmed, as they may not be able to be programmed again.

The processor 104 may then shuffle the fuse list 604 such that the order of the programmable fuses 130 is randomized (process block 608). For example, the processor 104 may use an algorithm that generates a random permutation of the fuse list 610, such as the Fisher-Yates Shuffle. In some embodiments, a software or hardware random number generator may be used to supply a random input 612 to the randomization algorithm, resulting in a truly random permutation of the fuse list 610. Additionally, a pseudorandom number generator (PRNG) may supply the randomization algorithm with a random input 612. Although PRNGs are not truly random because of a PRNG's dependence on the initial seed value, PRNG algorithms may provide high quality approximations of properties of sequences of random numbers. The initial seed value may be provided by the manufacturer or the designer (e.g., customer). Upon generation of the shuffled fuse list 610, the processor 104 may program one or more fuses 130 with the secure data 128 in a sequence according to the shuffled fuse list 610 (process block 614). In this manner, the security method 600 may be used in the process 500 to prevent side-channel attacks 400 by shuffling the fuse programming order.

Figure 7:
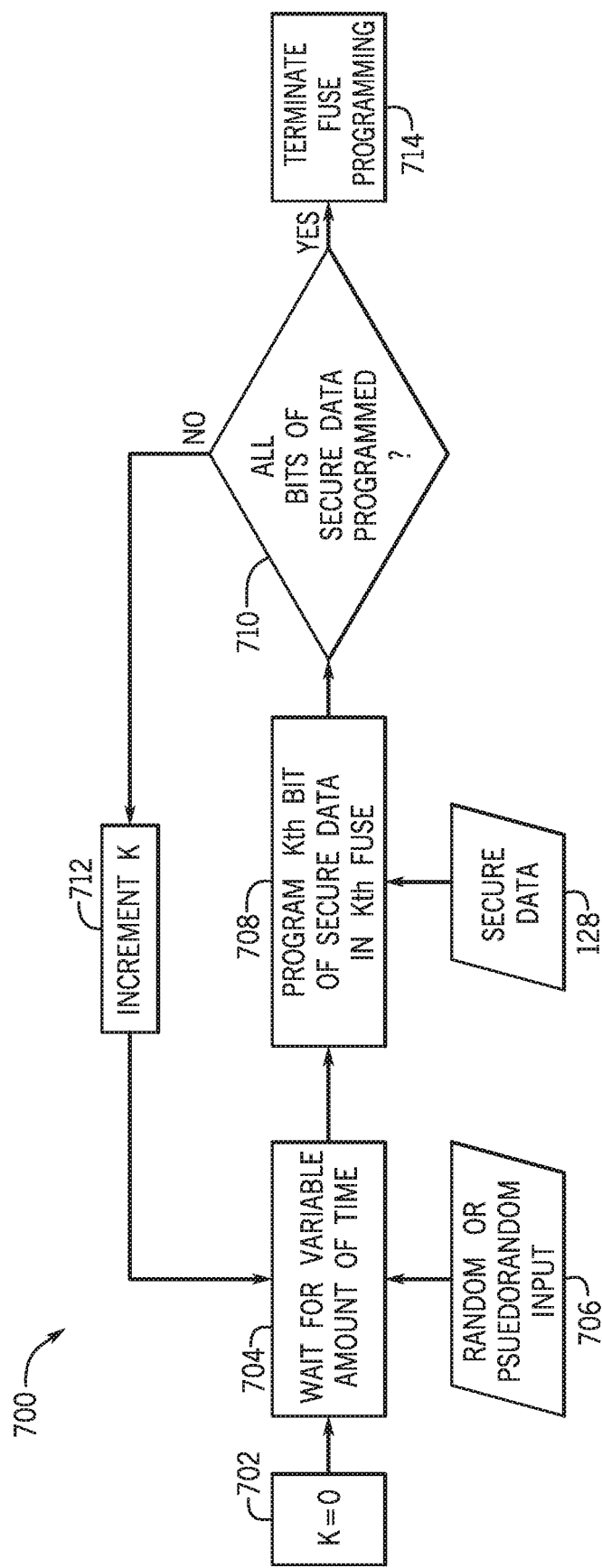
FIG. 7 is a flow diagram of a method used to program a fuse after a variable wait time in the process of FIG. 5 to prevent side-channel attacks, in accordance with an embodiment of the present disclosure.

Security method 700, illustrated in the flow diagram of FIG. 7, may be used to program the fuse 130 after a variable (e.g., random) wait time as an alternative to, or in combination with, the security method 600 of FIG. 6 in the process 500 to prevent side-channel attacks, in accordance with an embodiment of the present disclosure. The method 700 may be performed by any suitable device or combination of devices that may receive the secure data 128, perform the security method 700 for fuse programming, and program the fuses 130 using the security method 700. While the method 700 is described in a specific sequence, it should be understood that the present disclosure contemplates that the described method may be performed in different sequences than the sequence illustrated, and certain portions of the method may be skipped or not performed altogether. In some embodiments, at least some portions of the method 700 may be implemented by a processor 104. In alternative or additional embodiments, at least some portions of the method 700 may be implemented by any other suitable components or control logic, such as a compiler 110, a processor internal to the programmable device, and the like.

The processor 104 may receive one bit of the secure data 128 (process block 702). For example, if K is the bit position of the secure data 128, K=0 indicates that the first bit of the secure data 128. The processor 104 may then randomize the time allowed to elapse between each fuse 130 being programmed (e.g., blown) with each bit of the secure data 128 (process block 704). Randomizing the wait time may reduce the accuracy of determining the values 408 of the secure data 128 obtained via a side-channel attack 400 because the lack of programming current during the wait time may be interpreted as a fuse 130 not being programmed or blown. The processor 104 may randomize the wait time by using an algorithm that generates a random length of delay 706. Specifically, a software or hardware random number generator may be used to supply a variable (e.g., random) amount of wait time. Further, a pseudorandom number generator (PRNG) with an initial seed value may supply a variable length of delay 706. The initial seed value may be provided by the manufacturer or the designer (e.g., customer).

Once the variable (e.g., random) wait time has elapsed, the processor 104 may program the appropriate fuse 130 with the Kth bit of the secure data 128 (process block 708). For example, the value of the Kth bit is received from the secure data 128 and is programmed into the Kth fuse 200 in nonvolatile memory 116. It should be appreciated that an offset associated with the fuse location to be programmed with the secure data 128 may be added to the Kth value to shift the programmed location of the secure data 128 in nonvolatile memory 116.

The processor 104 may determine whether the programming of the secure data 128 has been completed (decision block 710). When unprogrammed bits of the secure data 128 remain, the bit of the secure data 128 to be programmed may be incremented (process block 712) and process blocks 704 and 708 of the security method 700 may be repeated. Upon completion of the programming of the secure data 128, the processor 104 may generate a signal to terminate fuse programming (process block 714). In this manner, the security method 700 may be used in the process 500 to prevent size-channel attacks 400 by randomizing the fuse programming wait time.

Figure 8:
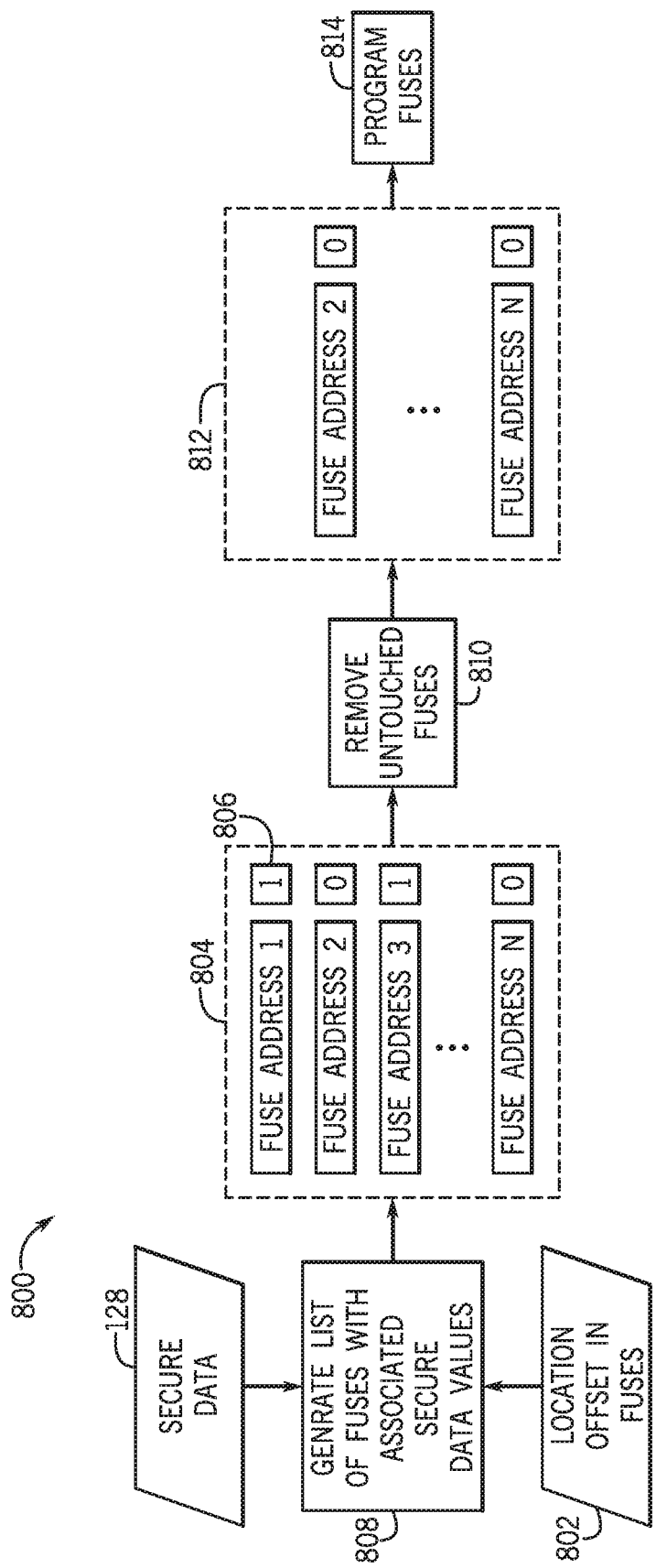
FIG. 8 is a flow diagram of a method used to avoid programming fuses already holding values to be programmed in the process of FIG. 5 to prevent side-channel attacks, in accordance with an embodiment of the present disclosure.

In an additional or alternative embodiment, the security method 800 depicted in the flow diagram of FIG. 8 may be used in the process 500 to prevent side-channel attacks by avoiding the programming of fuses 130 already holding values corresponding to the secure data 128. The method 800 may be performed by any suitable device or combination of devices that may receive the secure data 128, perform the security method 800 for fuse programming, and program the fuses 130 using the security method 800. While the method 800 is described in a specific sequence, it should be understood that the present disclosure contemplates that the described method may be performed in different sequences than the sequence illustrated, and certain portions of the method may be skipped or not performed altogether. In some embodiments, at least some portions of the method 800 may be implemented by a processor 104. In alternative or additional embodiments, at least some portions of the method 800 may be implemented by any other suitable components or control logic, such as a compiler 110, a processor internal to the programmable device, and the like.

The processor 104 may receive the secure data 128 to be programmed and a fuse location 802 where the secure data 128 is to be programmed. The processor 104 may generate a fuse list 804 that may include the fuses 130 that may be programmed with the secure data 128, the respective memory addresses of each fuse 130, and the bit values 806 of the secure data 128 to be programmed in each fuse 130 (process block 808). The processor 104 may generate the fuse list 804 based on the length of the secure data 128 and the location 802 that the secure data 128 is to be programmed.

The processor 104 may remove the fuses 130 from the fuse list 804 that already hold bit values 806 that are equal to corresponding values of the secure data 128 (process block 810). For example, if a fuse 130 is to be programmed as a high (i.e., a bit value of one), the processor 104 may remove the fuse 130 from the fuse list 804. Upon generation of this simplified fuse list 812, each fuse 130 on the fuse list 812 is programmed or blown, resulting in steady, high power consumption throughout the duration of the fuse programming (process block 814). This may prevent determination of the values of the secure data 128 being programmed in the fuses 130. In this manner, the security method 800 may be used in the process 500 to prevent side-channel attacks 400 by avoiding the programming of fuses 130 already holding values corresponding to the secure data 128.

Figure 9:
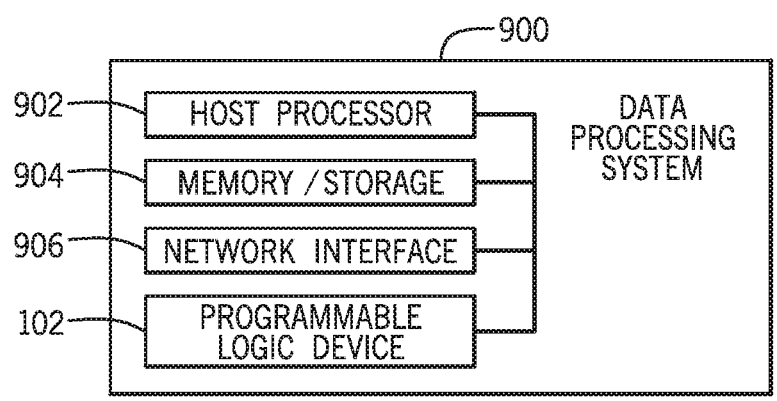
FIG. 9 is a block diagram of a data processing system that may use a programmable logic device (e.g., FPGA of FIG. 1) to secure the fuse programming process, in accordance with an embodiment.

Additionally, the programmable logic device (e.g., FPGA 102A) may be, or may be a component of, a data processing system. For example, the programmable logic device 102 may be a component of a data processing system 900, shown in FIG. 9. The data processing system 900 includes a host processor 902, memory and/or storage circuitry 904, and a network interface 906. The data processing system 900 may include more or fewer components (e.g., electronic display, user interface structures, application specific integrated circuits (ASICs)). The host processor 902 may include any suitable processor, such as an Intel® Xeon® processor or a reduced-instruction processor (e.g., a reduced instruction set computer (RISC), an Advanced RISC Machine (ARM) processor) that may manage a data processing request for the data processing system 900 (e.g., to perform machine learning, video processing, voice recognition, image recognition, data compression, database search ranking, bioinformatics, network security pattern identification, data encryption, or the like). The memory and/or storage circuitry 904 may include random access memory (RAM), read-only memory (ROM), one or more hard drives, flash memory, or the like. The memory and/or storage circuitry 904 may be considered external memory (e.g., main memory 106) to the programmable logic device 102, and may hold data to be processed by the data processing system 900. In some cases, the memory and/or storage circuitry 904 may also hold secure data 128 for programming the programmable logic device 102. In some instances, the memory and/or storage circuitry 904 may store instructions used by the host processor 902 to securely program the secure data 128 into the programmable logic device 102. The network interface 906 may allow the data processing system 900 to communicate with other electronic devices. The data processing system 900 may include several different packages or may be contained within a single package on a single package substrate.

In one example, the data processing system 900 may be part of a data center that processes a variety of different requests. For instance, the data processing system 900 may receive a data processing request via the network interface 906 to perform machine learning, video processing, voice recognition, image recognition, data compression, database search ranking, bioinformatics, network security pattern identification, data encryption, or some other specialized task. The host processor 902 may cause the programmable logic fabric of the programmable logic device 102 to be programmed with particular information related to a requested task. For instance, the programmable logic device 102 may include one or more fuses (e.g., the fuse 130). The host processor 902 may store secure data (e.g., a configuration bitstream, an encryption key, or the like) 128 in the one or more fuses 130. For example, the secure data 128 may include a configuration bitstream that represents a circuit design that performs the requested task and/or may include an encryption key that may be used to secure the configuration bitstream. Further, due to the desire to protect the secure data 128, the host processor 902 may designate where and how the secure data 128 may be stored in the in the one or more fuses 130. For example, when the secure data 128 includes the encryption key, the secure data 128 may be stored in nonvolatile memory 116 using process 500 to secure the fuse programming by shuffling the fuse order (process 600), programming the fuse 130 after variable wait time (process 700), and/or programming fuses 130 not already holding values corresponding to the values of the secure data 128 (process 800).

The methods and devices of this disclosure may be incorporated into any suitable circuit. For example, the methods and devices may be incorporated into numerous types of devices such as microprocessors or other integrated circuits. Exemplary integrated circuits include programmable array logic (PAL), programmable logic arrays (PLAs), field programmable logic arrays (FPLAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), and microprocessors, just to name a few.

The disclosed systems and methods may secure the fuse programming process in programmable devices to reduce or eliminate malicious discovery of secure data (e.g., the encryption key, the configuration bitstream) 128 stored in nonvolatile memory 116 via side-channel attacks (e.g., 400). A processor 104 may generate a shuffled (e.g., randomized) fuse list (e.g., via process block 608) and the fuses 130 may be blown in the shuffled order. Additionally, the processor 104 may randomize the wait time between programming of each fuse 130. Further, the processor 104 may generate a simplified fuse list 812 including only fuses 130 to be blown. The disclosed security systems and methods may be used individually or in combination to prevent determination of sensitive data, such as the secure data (e.g., the encryption key) 128, by monitoring, for example, power consumption in side-channel attacks.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

What is claimed is:

1. A method for securely programming a plurality of fuses of a programmable logic device, comprising:
   receiving, via a processor communicatively coupled to the programmable logic device, data to be programmed in a set of fuses of the plurality of fuses;
   generating, via the processor, a shuffled sequence of the plurality of fuses;
   determining, via the processor, a variable amount of time between programming a first fuse of the set of fuses and a second fuse of the set of fuses; and
   programming, via the processor, the set of fuses of the plurality of fuses with the data according to the shuffled sequence by programming the second fuse after the variable amount of time has elapsed from programming the first fuse.

2. The method of claim 1, wherein the data comprises an encryption key.

3. The method of claim 1, comprising:
   receiving, via the processor, an encrypted configuration bitstream configured to configure a programmable fabric of the programmable logic device; and
   programming, via the processor, the programmable fabric based at least in part on the encrypted configuration bitstream.

4. The method of claim 3, comprising decrypting, via the processor, the encrypted configuration bitstream using the data programmed in the set of fuses.

5. The method of claim 3, wherein programming, via the processor, the programmable fabric based at least in part on the encrypted configuration bitstream comprises decrypting, via the processor, the encrypted configuration bitstream using the data programmed in the set of fuses.

6. The method of claim 1, wherein the shuffled sequence of the plurality of fuses is generated by a Fisher-Yates shuffle algorithm.

7. The method of claim 1, wherein the shuffled sequence is generated by a shuffle algorithm based at least in part on a random number generator.

8. The method of claim 1, wherein the shuffled sequence is generated by a shuffle algorithm based at least in part on a pseudorandom number generator.

9. The method of claim 1, comprises selecting, via the processor, one or more fuses of the set of fuses based at least in part on a memory location offset.

10. The method of claim 1, comprising removing, via the processor, one or more fuses from the shuffled sequence of the plurality of fuses when the one or more fuses already hold the data to be programmed.

11. A system for securely programming a plurality of fuses of a programmable logic device, comprising:
    a processor configured to determine a variable amount of time; and
    a programmable logic device communicatively coupled to the processor, wherein the programmable logic device comprises the plurality of fuses configured to:
    receive a plurality of bits of data to be programmed in the plurality of fuses;
    store a first bit of data of the plurality of bits of data in a first fuse; and
    store a second bit of data in a second fuse when the variable amount of time has elapsed since storing the first bit of data in the first fuse.

12. The system of claim 11, wherein the programmable logic device comprises a field programmable gate array (FPGA) device.

13. The system of claim 11, wherein the processor is configured to determine the variable amount of time by using a random number generator or a pseudorandom number generator.

14. The system of claim 11, wherein the processor is configured to generate a shuffled sequence of the plurality of fuses upon receiving the plurality of bits of data; and remove one or more fuses of the plurality of fuses from the shuffled sequence when the one or more fuses already hold the data to be programmed.

15. The system of claim 14, wherein the first fuse immediately precedes the second fuse.

16. A tangible, non-transitory, computer readable medium storing instructions for securely programming a plurality of fuses of a programmable logic device, comprising instructions to cause a processor communicatively coupled to the programmable logic device to:
    receive data to be programmed in a set of fuses of the plurality of fuses;
    generate a sequence of the plurality of fuses;
    remove fuses from the sequence that are not included in the set of fuses;
    determine a variable amount of time to wait between programming a first fuse of the set of fuses and a second fuse of the set of fuses; and
    program the set of fuses with the data by programming the second fuse after the variable amount of time has elapsed from programming the first fuse.

17. The tangible, non-transitory, computer readable medium of claim 16, wherein the sequence comprises a shuffled sequence, wherein the instructions cause the processor to program the set of fuses with the data according to the shuffled sequence.

18. The tangible, non-transitory, computer readable medium of claim 17, wherein the shuffled sequence is generated by a shuffle algorithm based at least in part on a random number generator or a pseudorandom number generator.

19. The tangible, non-transitory, computer readable medium of claim 16, wherein the instructions cause the processor to determine the variable amount of time by using a random number generator.

20. The tangible, non-transitory, computer readable medium of claim 16, wherein the instructions cause the processor to determine the variable amount of time by using a pseudorandom number generator.

\* \* \* \* \*